United States Patent [19]

Berlinger, Jr.

[11] 4,144,774
[45] Mar. 20, 1979

[54] ACTUATOR DEVICE

[75] Inventor: Bernard E. Berlinger, Jr., Meadowbrook, Pa.

[73] Assignee: Westran Corporation, Muskegon, Mich.

[21] Appl. No.: 853,437

[22] Filed: Nov. 21, 1977

[51] Int. Cl.[2] .................. F16H 55/04; F16H 1/12; F16K 31/44
[52] U.S. Cl. .................. 74/435; 74/421 R; 251/249
[58] Field of Search .......... 251/248, 249, 249.5; 74/435, 421 R, 417

[56] References Cited

U.S. PATENT DOCUMENTS

| | | | |
|---|---|---|---|
| 3,472,082 | 10/1969 | Juvan | 74/435 X |
| 4,063,710 | 12/1977 | Minami et al. | 251/248 |
| 4,065,980 | 1/1978 | Ichinose | 74/435 X |

Primary Examiner—Leonard H. Gerin
Attorney, Agent, or Firm—Gifford, Chandler, VanOphem, Sheridan & Sprinkle

[57] ABSTRACT

An actuator assembly particularly useful for operating butterfly, ball or plug type valves is disclosed herein and comprises a relatively efficient gear train including first means for coupling the gear train to a drive member and a pinion in driving engagement with a sector gear of limited circumferential extent formed on a periphery, preferably an inner periphery, of a generally triangular sector member. At the vertex of the sector member opposite the sector gear there is provided a rotatably mounted drive member for driving the stem of an associated valve member as it rotates. Accordingly, as the sector gear is driven, the drive member rotates the valve stem to open or close the valve. The input gear train includes a non-reversing coupling means adjacent the first coupling means whereby the drive member can rotate the sector member and, thus, the valve stem, but external forces on the output side of the non-reversing coupling means cannot cause rotation of the valve stem.

13 Claims, 4 Drawing Figures

ACTUATOR DEVICE

This invention relates to an actuator device usable to effect rotational movement of an associated device and more particularly, to an actuator device usable to effect a limited rotational movement in a valve or similar type device.

Various mechanical devices include components with different operating positions spaced apart by a limited circumferential extent. For example, butterfly, ball and plug valves have a valve member that moves through a limited arc, usually about ninety (90°) degrees, between the open and closed positions of the valve. A large number of these mechanical devices, particularly valves of the type noted, are generally associated with an actuator device for effecting its opening or closing. Usually these valve actuator devices include gear trains associated with an input power source, for example, a hand wheel or motor, for driving a component of the associated device, in the case of valve, the valve stem. Certain of the gear trains used in these actuating devices include at least one and sometimes two worm-wormwheel combinations. As an example, one known valve actuator device includes an input shaft adapted to be manually driven and formed with a worm gear in meshing engagement with a sector gear in the form of a worm wheel formed on the outer periphery of one side of a generally triangular sector member. Because worm gears of this type are generally low efficiency gears, usually on the order of about twenty-five (25) to thirty (30) percent at best, actuator devices including these worm gears also operate with a low efficiency. The valve actuator described above has an efficiency of only about thirty (30) percent. Thus, these actuator devices require undesirably large input power and an undesirably large number of revolutions of the input shaft to operate the associated device.

While low efficiency actuator devices have undesirably high input power requirements, they have been considered generally satisfactory because the high power requirements provide a highly advantageous non-reversing function. That is, external forces applied to the device with which the actuator device is used react through the gear train without allowing the various components of the associated device or the gears in the train to move from their desired positions. As an example, if low efficiency actuator devices are used to open and close butterfly, ball or plug type valves high pressure fluid forces acting on the valve members tend to move the valve members from their open or closed position. These fluid pressure forces, however, react through the gear trains which, because of their low efficiency, do not move and thus hold the valve member in its desired position.

Accordingly, it is a primary object of this invention to provide an actuator device which is highly efficient.

It is another object of this invention to provide an actuator device with a highly efficient gear train having relatively low power input requirements and which prevents unwanted movement of the gear train and components of an associated device.

It is yet another object of this invention to provide a highly efficient actuator device particularly useful with butterfly, ball or plug type valves for opening and closing these valves and which prevents fluid forces from inadvertently opening or closing the valve.

Finally, it is an object of this invention to provide an actuator device that is relatively compact, economical and relatively easy to make and use.

These and other objects of this invention are accomplished by providing an actuator device including a highly efficient gear train having first means for coupling the gear train to driver means and further having a drive pinion gear in driving engagement with a sector gear of limited circumferential extent. The sector gear is formed on a periphery, preferably an inner periphery, of a generally triangular sector member. At the vertex of the sector member opposite the sector gear, there is formed a drive means for rotating a component of an associated device, for example, a valve stem. The drive means is mounted for rotation about an axis perpendicular to a plane defined by the sides of the sector member whereby the pinion means is operative to drive the sector gear and rotate the drive means to effectuate movement of the component of the assoicated device.

The gear train includes non-reversing coupling means located with the first coupling means on its input side and with the sector member on its output side for allowing input force to be transmitted through the gear train for driving the sector member and, thus, the component of the associated device and for preventing external force on its output side from rotating the sector member and, thus, the component of the associated device.

For a better understanding of the invention, reference is made to the following description of a preferred embodiment, taken in conjunction with the figures of the accompanying drawing in which.

Figure 3:
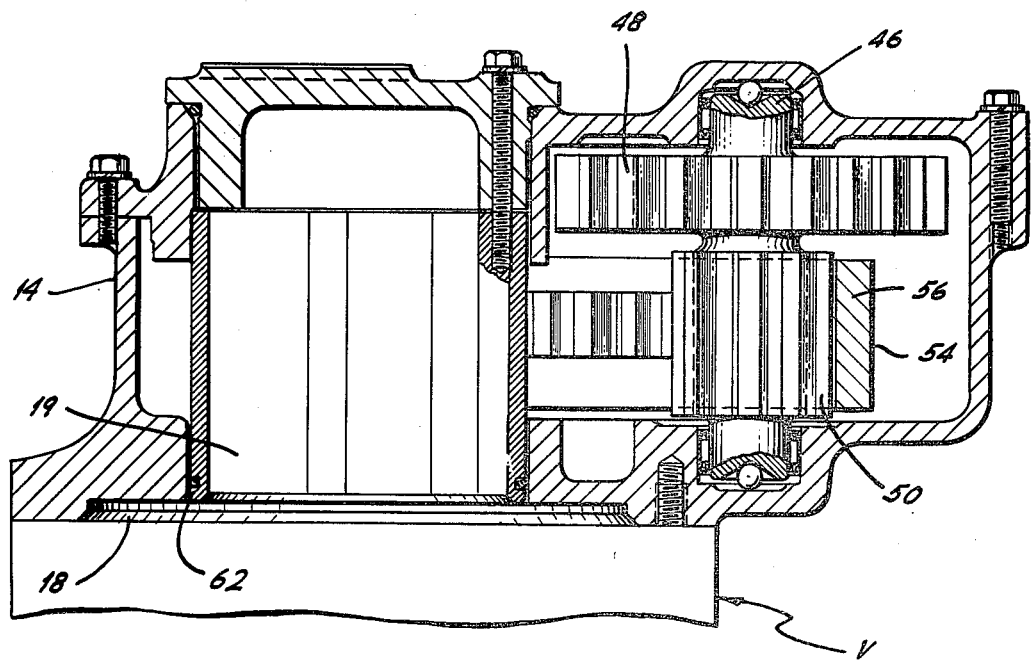
FIG. 3 is a sectional view of the actuator device illustrated in FIG. 1 and taken along the line 3—3 thereof.

Referring now particularly to the drawing, there is illustrated an actuator device 10 particularly useful for opening or closing a valve of the butterfly, ball or plug type, that is, a valve having a movement between its open and closed positions of limited circumferential extent. Normally, the range of movement of these valve members between an open and closed position is on the order of ninety (90°) degrees. It should be particularly understood, however, that an actuator device in accordance with this invention is usable with other types of mechanical devices to effectuate desired movement of various component parts. It should also be understood that the range of movement between the desired positions of the component parts may be greater or less than ninety (90°) degrees, but is generally of limited extent. In most applications rotation of the component parts will be less than three hundred sixty (360°) degrees, but in some applications it will exceed three hundred sixty (360°). For the sake of convenience in describing the actuator device 10, reference will be made to its use with a valve member of the butterfly, ball, or plug type. Actuator device 10 can be seen to include an upper housing portion 12 and a lower housing portion 14 which is generally cardioid or kidney shaped and which includes a cusp 16. Adjacent the cusp 16, as best seen in FIG. 3 of the drawing, the lower housing portion 14 is formed with an opening 18 and the actuator 10 is normally associated with the valve V such that the valve stem 19 extends upwardly into the lower housing portion through the opening.

Figure 1:
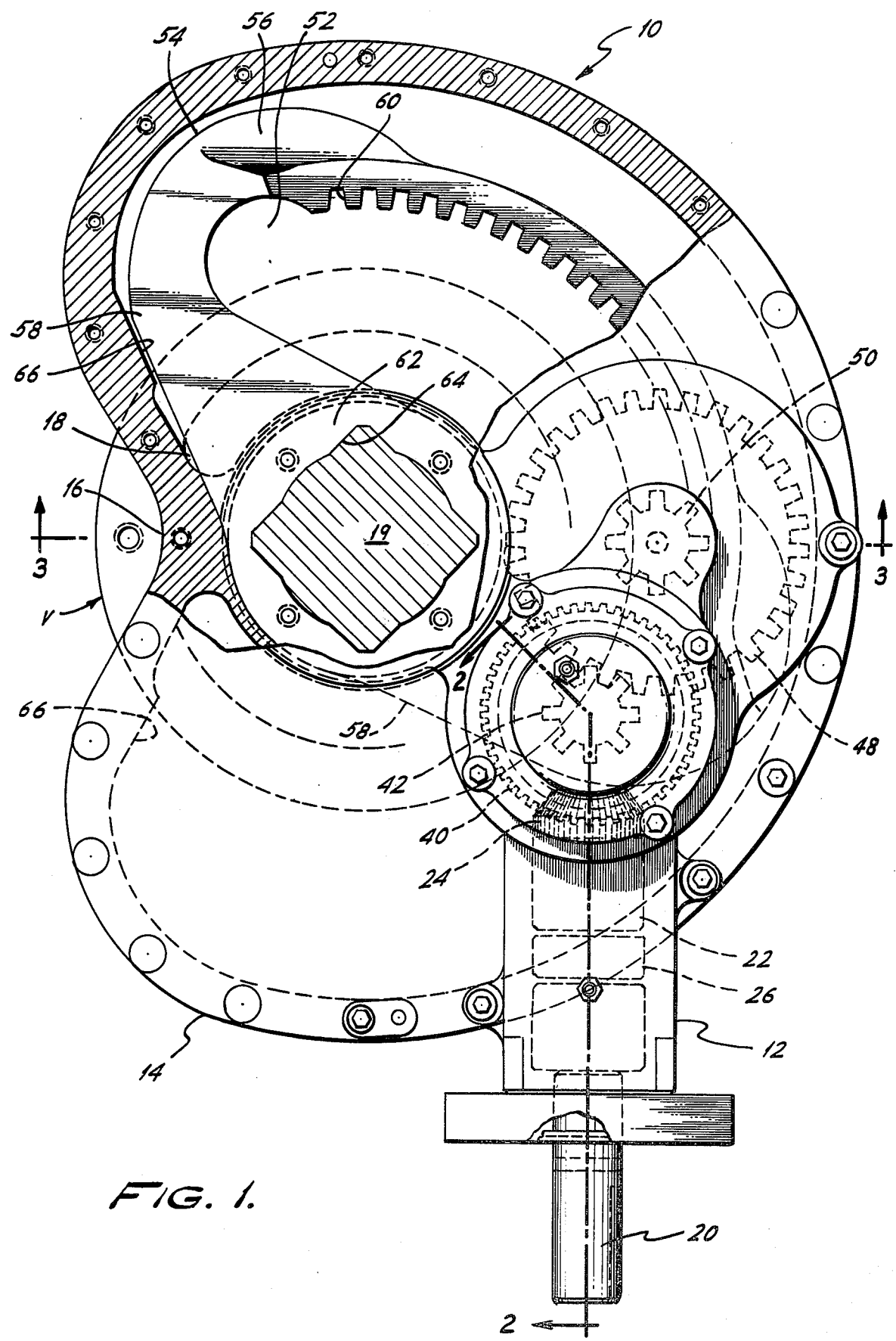
FIG. 1 is a plan view of an actuator device in accordance with this invention with portions of the housing broken away for the sake of clarity.
Figure 2:
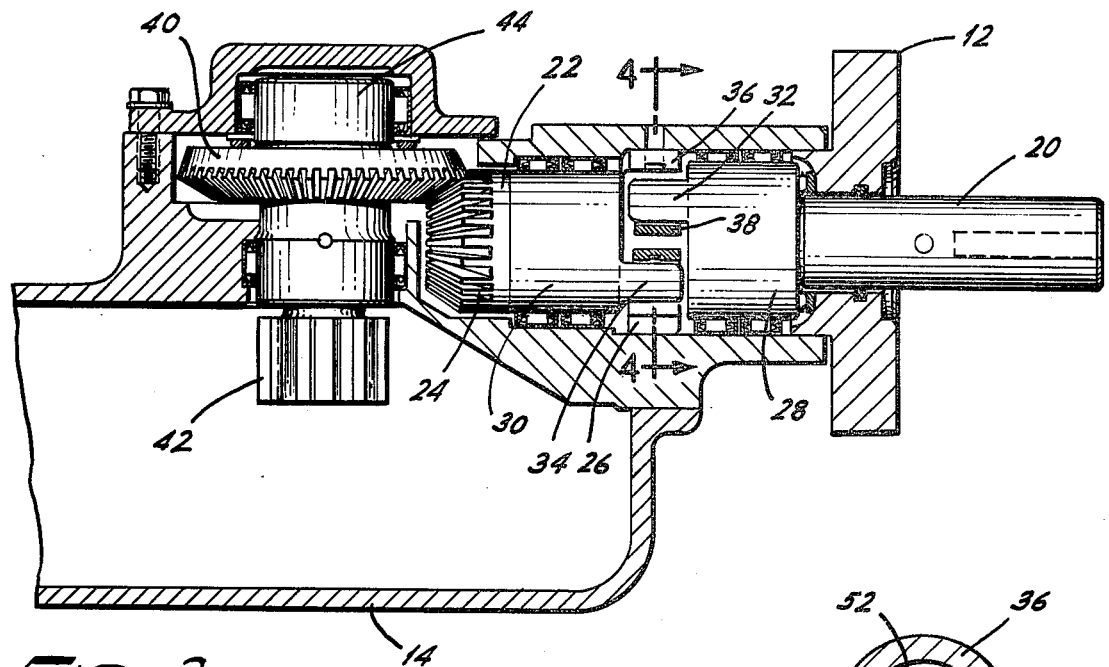
FIG. 2 is a partial section view of the actuator device illustrated in FIG. 1 and taken along the line 2—2 thereof.

Referring particularly now to FIGS. 1 and 2, a portion of a highly efficient gear train for effectuating movement of the stem 19 can be seen to include a first drive shaft 20 located in the upper housing portion 12 and which is adapted to be connected to a driver means or input power source. For example, a hand wheel (not shown) could be attached to the keyway (not numbered) formed in the end of the drive shaft 20 extending outwardly of the upper housing portion 12 whereby manual operation of the hand wheel rotates the drive shaft. Alternatively, the drive shaft 20 can be arranged to be driven by a motor of any suitable type. Longitudinally aligned with the first drive shaft 20 is a second drive shaft 22, the end of which more remote from the first drive shaft 20 is formed with a bevel gear configuration 24. Suitable bearing arrangements (not numbered) are provided to facilitate rotation of the shafts 20 and 22 in the housing 12. The drive shafts 20 and 22 are coupled together by a non-reversing coupling means 26 so that input force rotating the first drive shaft 20 in either direction is operative to rotate the second drive shaft 22, but external force applied to the second drive shaft 22 from the output side of the coupling means 26 does not rotate the first drive shaft in either direction. As will be made clear hereinafter, the gear train rotates only when desirable input force is applied to the shaft 20, but no rotation occurs when undesirable external force is applied in the output side of the gear train.

Figure 4:
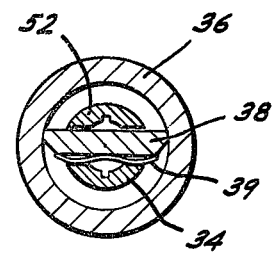
FIG. 4 is a sectional view taken generally along line 4—4 of FIG. 2 and showing a non-reversing coupling usable with this invention.

Various suitable non-reversing coupling means can be utilized, for example, a device manufactured and sold by Ann Arbor Bearing and Manufacturing Company, Ann Arbor, Michigan and sold under the trademark NOBAK. Briefly, this device includes sleeve assemblies 28 and 30 fixedly carried on the ends of the drive shafts 20 and 22, respectively. The sleeve assemblies 28 and 30 include a locking finger 32 and 34, respectively, which extend inwardly toward each other to be received adjacent a lock ring 36 fixed to the inside of the housing 12. As best seen in FIG. 4 of the drawing a locking bar 38 having a length less than the diameter of the lock ring 36 is located in and extends across the ring so that the ends of the locking bar bear on the inner periphery of the ring. Thus, the inner area of the lock ring is divided into a large area in which the finger 34 is received and a small area in which the finger 32 is received. A leaf spring 39 located between the locking bar 38 and the finger 34 normally biases the locking bar into engagement with the finger 32 and the inner periphery of the lock ring 36. Thus input force rotating the first drive shaft 20 in either direction is transmitted to the finger 34 through the lock bar 38 causing the drive shaft 22 to rotate in the same direction. If an external force tending to rotate the drive shaft 22 is applied on the output side of the non-reversing coupling 26, for example, a fluid force acting on the valve V, the finger 34 transmits the force to the inner periphery of the lock ring 36 through the locking bar 38, but not to the finger 32. Thus, these external forces do not cause rotation of the drive shafts 20 and 22.

Still referring to FIGS. 1 and 2, compound gear means can be seen to include a bevel gear 40 and a pinion gear 42. The bevel gear 24 is in driving engagement with the bevel gear 40 which is formed on or fixed to a shaft 44 rotatable about an axis perpendicular to the axis of the drive shafts 20 and 22. The bevel gear 40 is located toward the upper side, as viewed in FIG. 2, of the housing portion 12. The shaft 44 extends downwardly into the upper region of the lower housing portion 14 where the pinion gear 44 is formed or fixed to the shaft. Accordingly, rotation of the shaft 20 drives the shaft 22 and, of course, the shaft 44 through the engagement of the bevel gears 24 and 40. As the shaft 44 is driven, it causes rotation of the pinion gear 42. Suitable bearing means are provided for the shaft 44 as will be understood by those skilled in the art.

Referring to FIGS. 1 and 3, the remaining portions of the gear train can be seen to include another compound gear means including a shaft 45 rotatably mounted in the lower housing portion 14 at a point adjacent the cusp 16 and the opening 18 formed in the lower housing portion. Suitable bearings are provided as will be understood by those skilled in the art to facilitate rotation of the shaft 46. Adjacent the upper region of the lower housing portion 14, the shaft 46 is formed with or fixedly carries a pinion gear 48 which is in meshing engagement with the pinion gear 42 on the shaft 44. Thus, rotation of the shaft 44 causes rotation of the shaft 46 through the engagement of the pinions 42 and 48. Adjacent the lower region of the lower housing portion 14, the shaft 46 is formed with or fixedly carries another pinion gear 50, which, of course, rotates with the shaft 46. As clearly seen in FIG. 1 of the drawing, the axis of rotation of the shaft 46 and thus of the pinion gear 50 is parallel to the longitudinal axis through the opening 18.

Referring now particularly to FIG. 1 of the drawing, it can be seen that the pinion gear 50 is located within an opening 52 formed in a generally triangular sector member 54 by an arcuate leg portion 56 and a pair of generally straight leg portions 58, 58. Because of the arcuate leg portion 56, the sector member 54 is actually pie-shaped. The radius of the arcuate leg portion 56 is such that it is slightly smaller than that of the arcuate portion of the cardioid-shaped lower housing portion 14 so that there is a slight clearance provided.

The inner periphery of the arcuate leg portion 56 is formed with gear teeth 60 so that a generally arcuate rack member is provided that meshes with the pinion gear 50. Rotation of the shaft 46 and, of course, of the pinion gear 50 is operative to drive the sector member 54 about an axis through the vertex opposite the leg portion 56. By locating the gear teeth 60 on the inner periphery of leg portion 56 instead of its outer periphery, the size of the lower housing portion 14 can be reduced providing a more compact and economical device and a larger profile contact ratio between the teeth of pinion gear 50 and the gear teeth 60 is provided. Because of the larger profile contact ratio, larger tangential forces per tooth area are transmitted through these gears. This means that the material required to form the gears is minimized and the gears can be made smaller providing lower weight and manufacturing costs. At the vertex opposite the leg portion 56, that is, the vertex formed by the two generally straight leg portions 58, 58, the sector member 54 is formed with a drive member 62 mounted for rotation about the longitudinal axis of the opening 18. The drive member 62 is in the form of a generally cylindrical boss having a central opening 64 in which the valve stem 19 is received. The stem 19 is keyed to the inner wall forming the opening and this is conveniently accomplished by providing the opening 64 and the valve stem 19 with a square shape. Thus, rotation of the drive member 62 is operative to rotate the valve stem a corresponding distance.

It can be seen in FIG. 1, that the straight leg portions 58, 58 of the sector member will butt against stop pads 66 formed on the wall portions of the lower housing portion 14 adjacent the cusp 16. Accordingly, a stop arrangement is provided to limit the travel of the sector member 54. If desired threaded screws can extend through the stop pads 66 so that they function as adjustable stops.

As illustrated in the preferred embodiment, the circumferential extent of the gear teeth 60 is just slightly greater than ninety (90°) degrees whereby the valve stem 19 can be rotated through about ninety (90°) degrees between the open and closed position of the valve. The circumferential extent of the teeth 66 can, of course, be varied depending on the circumferential extent that must be traversed by the valve stem or other device with which the actuator device is used.

From the preceding description it should be understood that rotation of the first drive shaft 20 in either direction by a hand wheel or motor is transmitted to the second drive shaft 22 through the non-reversing coupling means 26. As the second shaft 22 is rotated, the bevel gear 24 drives the shaft 44 through the bevel gear 40 and that the pinion gear 42, rotating with the shaft 42, drives the pinion gear 48 and the shaft 46. The pinion gear 50 carried on the shaft 46 is then operative to drive the sector member 54 through the sector gear teeth 60 and operate the valve stem 19 through the drive member 62. It should be understood that the gear train utilized in the actuator described herein includes no worm gears and, thus, the drive train can be highly efficient. For example, on a device constructed in accordance with this invention the efficiency of the gear train has been found to be on the order of 88.5% and it should be understood that efficiencies of at least 85% are preferable. With this relatively high efficiency, minimum input power is necessitated, operation of the valve member is facilitated and lower costs result. In addition, it should be understood that because of the non-reversing coupling means 26 external forces in either the gear train or associated device on the output side of the coupling are reacted through the gear train and cannot cause rotation of either.

While in the foregoing, there has been described a preferred embodiment of the invention, it should be understood to those skilled in the art that various changes and modifications can be made without departing from the true spirit and scope of the invention as recited in the appended claims.

I claim:

1. An actuator device for driving a component of an associated device through a limited circumferenial extent, said actuator device comprising a gear train including first coupling means for coupling said gear train to driver means, said gear train having a relatively high efficiency and including pinion means and a sector gear of limited circumferential extent, said pinion means and said sector gear being in meshing engagement, said sector gear being formed on a periphery of one side of a generally triangular sector member, drive means for rotating a component of an associated device, said drive means being formed at the vertex of said sector member opposite said one side and being mounted for rotation about an axis perpendicular to a plane defined by the sides of said sector member whereby said pinion means is operative to drive said sector gear and rotate said drive means to effectuate movement of the component of the associated device.

2. An actuator device in accordance with claim 1 further including non-reversing coupling means located in said gear train with said first coupling means on the input side thereof and with said sector member on the output side thereof for allowing input force to be transmitted through said gear train for driving said sector member in either direction and for preventing external forces on the output side thereof from rotating said sector member.

3. An actuator device in accordance with claim 1 wherein said sector member comprises three legs forming a central opening therein and wherein said sector gear is formed on the inner surface of one of said legs.

4. An actuator device in accordance with claim 3 wherein said one of said legs is generally arcuate and said other legs extend in a generally straight line from said one of said legs toward said vertex whereby said sector member is generally pie-shaped.

5. An actuator device in accordance with claim 4 wherein said one of said legs has an arcuate extent of less than 360 degrees.

6. An actuator device in accordance with claim 4 wherein said one of said legs has an arcuate extent slightly greater than about 90 degrees.

7. An actuator device in accordance with claim 1 including stop means for limiting movement of said sector member.

8. An actuator device in accordance with claim 1 wherein the efficiency of said gear train is at least eighty-five (85%) percent.

9. An actuator device in accordance with claim 1 wherein said gear train includes drive shaft means, one end of said drive shaft means including said first coupling means and the other end thereof including bevel gear means, first and second compound gear means, said first compound gear means being driven by said bevel gear means and driving said second compound gear means, said pinion means being part of said second compound gear means.

10. An actuator device in accordance with claim 9 wherein said drive shaft means includes a first shaft portion including said first coupling means and a second shaft portion including said bevel gear means, non-reversing coupling means between said first and second shaft portions for allowing input force applied to said first shaft portion to drive said second shaft portion in either direction and for preventing external forces on the output side of said non-reversing coupling means from rotating said sector member, either of said compound gear members or said second shaft portion.

11. An actuator device in accordance with claim 10 wherein said non-reversing coupling means includes a lock ring and a locking bar located within said lock ring and having a length smaller than the diameter of said lock ring whereby said locking bar seats on the inner periphery of said lock ring and is off-center with respect thereto forming a smaller area portion and a larger area portion, said first shaft portion including a finger located in the smaller area portion and said second shaft portion including a finger located in the larger area portion whereby input force on the first shaft portion is transmitted to the second shaft portion through said locking bar and external force on the second shaft portion is transmitted to the lock ring through said locking bar.

12. An actuator device for driving a component of an associated device, said actuator device comprising a gear train including first coupling means for coupling said gear train to a driver means, said gear train having a relatively high efficiency and including pinion means in driving engagement with a sector gear, said sector gear being formed on a periphery of one side of a generally triangular sector member, drive means for rotating a component of an associated device, said drive means being formed at the vertex of said sector member opposite said one side and being mounted for rotation about an axis perpendicular to a plane defined by the sides of said sector member whereby said pinion means is operative to drive said sector member and rotate said drive means to effectuate movement of the component of the associated device, non-reversing coupling means located in said gear train with said first coupling means on the input side thereof and with said sector member on the output side thereof for allowing input force to be transmitted through said gear train for driving said sector member in either direction and for preventing external forces on the output side thereof from rotating said sector member.

13. An actuator device in accordance with claim 12 wherein said sector member comprises three legs forming a central opening therein and wherein said sector gear is formed on the inner surface of one of said legs.

* * * * *